United States Patent
Padhye et al.

(10) Patent No.: US 7,616,575 B2
(45) Date of Patent: Nov. 10, 2009

(54) SYSTEM AND METHOD FOR LINK QUALITY ROUTING USING A WEIGHTED CUMULATIVE EXPECTED TRANSMISSION TIME METRIC

(75) Inventors: Jitendra D. Padhye, Redmond, WA (US); Richard P. Draves, Jr., Seattle, WA (US); Brian D. Zill, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 11/081,120

(22) Filed: Mar. 15, 2005

(65) Prior Publication Data

US 2005/0286426 A1 Dec. 29, 2005

Related U.S. Application Data

(60) Provisional application No. 60/582,360, filed on Jun. 23, 2004.

(51) Int. Cl.
H04L 12/28 (2006.01)
(52) U.S. Cl. .................. 370/238; 370/248; 370/351
(58) Field of Classification Search .......... 370/229, 370/231, 238, 351
See application file for complete search history.

(56) References Cited

U.S. PATENT DOCUMENTS 6,304,556 B1 * 10/2001 Haas .................. 370/254
2004/0025018 A1 * 2/2004 Haas et al. ............ 713/168
2004/0219922 A1 * 11/2004 Gage et al. ............ 455/445
2004/0264372 A1 * 12/2004 Huang .................. 370/230
2005/0164709 A1 * 7/2005 Balasubramanian et al. 455/453
2006/0007863 A1 * 1/2006 Naghian ................ 370/238

OTHER PUBLICATIONS

De Couto, D. et al., "Performance of Multihop Wireless Networks: Shortest Path is Not Enough", ACM SIGCOMM Computer Communications Review, vol. 33, No. 1, Jan. 2003, pp. 83-88.
De Couto, D. et al., "A High-Throughput Path Metric for Multi-Hop Wireless Routing", MobiCom, Sep. 14-19, 2003, pp. 134-146.
Jain, K. et al., "Impact of Interference on Multi-hop Wireless Network Performance", MobiCom, Sep. 14-19, 2003, 14 pgs.

* cited by examiner

*Primary Examiner*—Kevin C Harper
*Assistant Examiner*—Mon Cheri S Davenport
(74) *Attorney, Agent, or Firm*—Merchant & Gould, P.C.

(57) ABSTRACT

A system and method for link quality routing uses a weighted cumulative expected transmission time path metric. A system for routing in a multi-hop ad hoc network, and a method for measuring the link quality of a route in the network, include assignment of a weight to a link in accordance with an expected transmission time of a packet over the link, and a combining of individual link weights for a route into a path metric. The path metric accounts for interference among links that use a shared channel. In the calculation of the path metric, the expected transmission times of links that interfere with one another are added, while the expected transmission times for non-interfering links are considered separately.

20 Claims, 8 Drawing Sheets

SYSTEM AND METHOD FOR LINK QUALITY ROUTING USING A WEIGHTED CUMULATIVE EXPECTED TRANSMISSION TIME METRIC

RELATED APPLICATIONS

This patent application claims priority to U.S. Provisional Patent Application No. 60/582,360 filed on Jun. 23, 2004, which is incorporated herein by reference.

FIELD OF THE INVENTION

The present invention relates generally to computer networks, and more particularly to metrics for link quality routing protocols in multi-hop wireless networks.

BACKGROUND OF THE INVENTION

Routing refers to the problem of selecting a path through a computer network along which a message will travel from a source node to a destination node. Routing in multi-hop ad hoc networks presents particular challenges. Ad hoc networks are self-organizing networks in which nodes cooperatively maintain network connectivity. Nodes in an ad hoc wireless network are equipped with radio transceivers, such as network interface cards that conform to IEEE 802.11 standards. Such radios allow communication between nodes without requiring centralized network administration or fixed network infrastructure. Since each radio has a limited effective range, two distant nodes must communicate across multi-hop paths. Intermediary nodes in the path act as routers by forwarding packets.

Wireless community "mesh" networks are an increasingly important kind of multi-hop wireless network that is being deployed to provide broadband Internet access to communities. In these networks, nodes are either stationary or minimally mobile and typically do not rely on battery power. Rather than coping with mobility or minimizing power usage, routing techniques for wireless community networks focus on improving network capacity or the performance of individual transfers.

Suboptimal network capacity is a general problem associated with multi-hop wireless networks. In such networks, throughput degrades quickly as the number of hops increases. In 802.11 networks this is due in part to the inherent unfairness of the 802.11 MAC, which can stall the flow of packets over multiple hops. In addition, such networks typically use only a small portion of the available frequency spectrum and a single radio on each node for transmitting and receiving packets.

One approach to the improvement of network capacity for multi-hop wireless networks is to equip nodes with more than one radio. This solution has several advantages. A node with multiple radios can transmit and receive simultaneously. Moreover, a node having two radios can transmit on two channels simultaneously, enabling the network to make use of a greater portion of the frequency spectrum. In addition, the use of multiple heterogeneous radios that operate on different frequency bands (e.g., 802.11a at 5 Ghz and 802.11b/g at 2.4 GHz), with different bandwidth, range and fading characteristics, can improve robustness, connectivity and performance. Finally, 802.11 network interface cards are off-the-shelf commodity parts available at rapidly diminishing prices.

Most routing protocols for multi-hop wireless networks have focused on choosing paths having the least number of intermediate hops. The disadvantages of applying shortest-path routing in such networks are well-recognized. Choosing paths that minimize hop count can lead to poor performance, in part because such paths often include slow or lossy wireless links between distant nodes. Shortest-path routing techniques perform particularly poorly in networks having nodes with multiple radios. This is illustrated by the following two scenarios. First, consider a network in which each node has an 802.11a and an 802.11b radio. 802.11b radios generally have a longer range than 802.11a radios. Therefore, if shortest-path routing is used, most of the traffic in the network will be carried on the slower 802.11b links. Now suppose that each node in the network instead has two 802.11b radios, one tuned to channel 1 and the other tuned to channel 11. Consider a two-hop (three-node) path in this network. A path that is entirely over channel 1 or channel 11 will have significantly worse throughput than a path in which the two hops are on different channels. The use of a shortest-path algorithm that selects a path without ensuring that the hops are on different channels will therefore result in suboptimal performance.

Routing according to link quality is one well-known alternative to shortest-path routing. Several link quality metrics for multi-hop wireless networks have been proposed by researchers, but these schemes have focused on networks having homogeneous single-radio nodes. One example is the ETX metric, described in D. S. J. De Couto, D. Aguayo, J. Bicket, and R. Morris, "A High-Throughput Path Metric for Multi-Hop Wireless Routing," ACM MOBICOM (September 2003), incorporated herein by reference. ETX measures the expected number of transmissions, including retransmissions, needed to send a unicast packet across a link. The path metric is the sum of the ETX values for each link in the path. The routing protocol selects the path with the minimum path metric.

A review of ETX is useful for understanding embodiments of the invention disclosed herein. The derivation of ETX begins with measurements of the underlying packet loss probability in both forward and reverse directions (denoted by $p_f$ and $p_r$, respectively). First, the probability that a packet transmission is not successful is calculated. For a packet transmission to be successful, the 802.11 protocol requires successful acknowledgement of the packet. Let p denote the probability that the packet transmission from x to y is not successful. Then:

$$p = 1 - (1-p_f)^*(1-p_r)$$

The 802.11 MAC will retransmit a packet for which a transmission was unsuccessful. Let s(k) denote the probability that the packet will be successfully delivered from x to y after k attempts. Then:

$$s(k) = p^{k-1} * (1-p)$$

Finally, the expected number of transmissions required to successfully deliver a packet from x to y is denoted by ETX:

$$ETX = \sum_{k=1}^{\infty} k * s(k) = \frac{1}{1-p}$$

While ETX performs well in homogeneous single-radio network environments, ETX will not necessarily select good routes in the multiple-radio scenarios discussed above. In the first scenario, in which each node has an 802.11a radio and an 802.11b radio, ETX will route most of the traffic on the 802.11b links, for two reasons. First, ETX only considers loss rates on the links, and not their bandwidths. Second, in an attempt to minimize global resource usage, ETX is designed to give preference to shorter paths over longer paths, as long as loss rates on the shorter paths are not significantly higher. In the second scenario, in which each node has two 802.11b radios, ETX is again likely to select suboptimal paths, because ETX does not give any preference to channel-diverse paths. Therefore, ETX, like other existing routing techniques and path metrics, fails to derive full benefit from the availability of multiple radios and the presence of link interference and varying bandwidths in multi-hop networks.

SUMMARY OF THE INVENTION

Certain aspects of the present invention are directed to a system and method for routing according to link quality, using a weighted cumulative expected transmission time path metric. A system for routing in a multi-hop ad hoc network, and a method for measuring the link quality of a route in the network, include assignment of a weight to a link in accordance with an expected transmission time of a packet over the link, and a combining of individual link weights for a route into a path metric. The path metric accounts for interference among links that use a shared channel. In the calculation of the path metric, the expected transmission times of links that interfere with one another are added, while the expected transmission times for non-interfering links are considered separately. Embodiments of the invention may be practiced in a multi-hop network in which nodes are each equipped with one or more radio transceivers.

The invention may be implemented in whole or in part in software, in hardware, or a combination thereof. Computing devices in a network that are configured to implement the systems and perform the methods associated with the present invention are contemplated.

DETAILED DESCRIPTION OF EMBODIMENTS OF THE INVENTION

Figure 1:
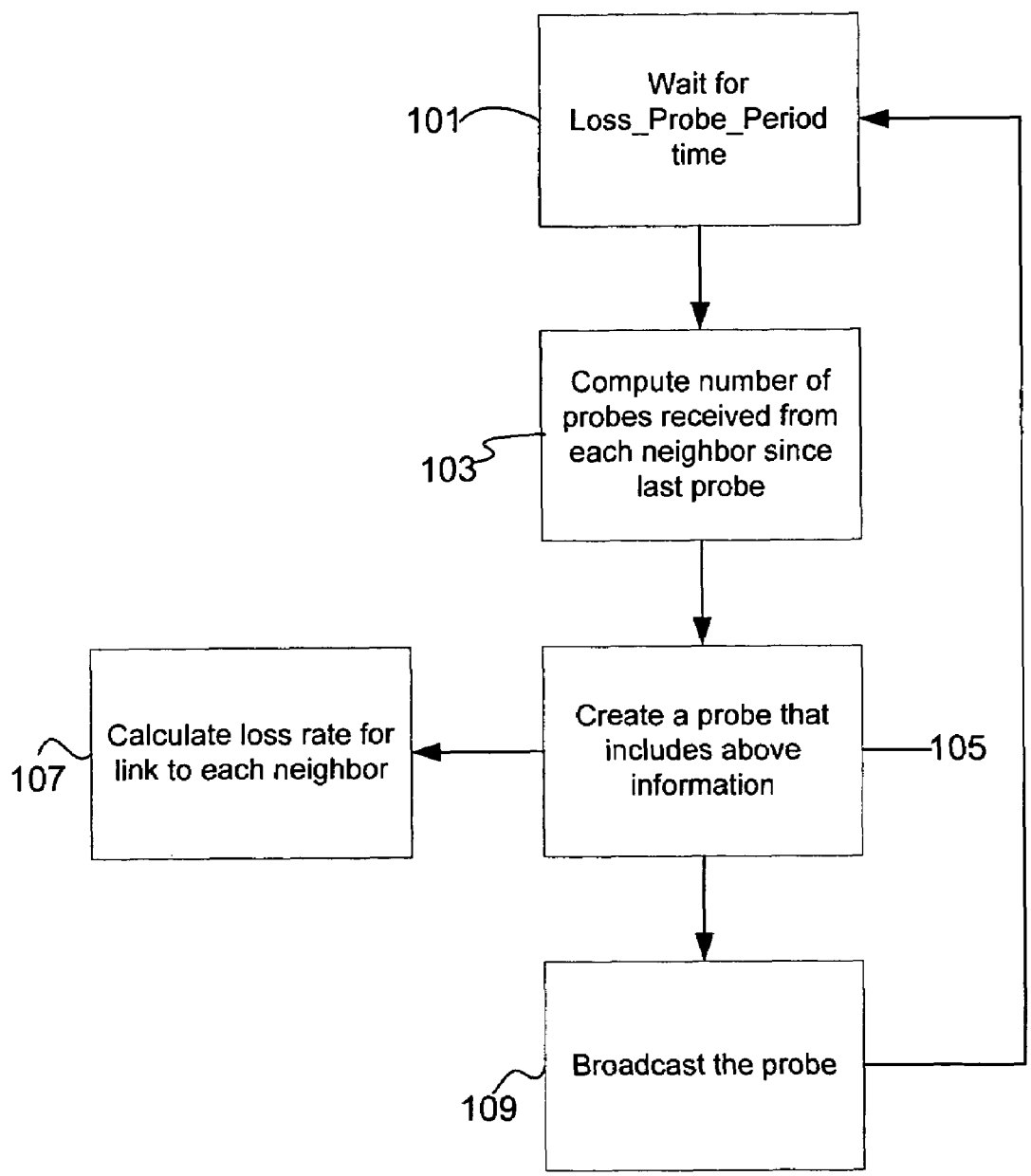
FIG. 1 is a flow diagram illustrating steps taken by a probe sender node in calculating the loss rate for the ETT measurement, in accordance with an embodiment of the invention.

In the following description, certain embodiments of the present invention will be presented. For purposes of explanation, specific configurations and details are set forth in order to provide a thorough understanding of the embodiments. However, it will also be apparent to one having skill in the art that the present invention may be practiced without the specific details. Furthermore, well-known features may be omitted or simplified in order not to obscure the embodiment being described.

Embodiments of the invention include a new routing metric, Weighted Cumulative Expected Transmission Time (WC-ETT), for selecting a high-throughput path between a source node and a destination node in a multi-hop network. Although it is not limited thus, the metric is especially advantageous in wireless networks in which at least some nodes are equipped with multiple heterogeneous radios, and in which some links interfere with one another. The WCETT metric enables the selection of channel-diverse paths. For each link, a weight is assigned based on the Expected Transmission Time (ETT) for a packet of a fixed size to be successfully transmitted over that link. The ETT is a function of both the loss rate and the bandwidth of the link. In alternative embodiments of the invention, measurements of link quality other than ETT are used. The individual link weights are combined into the WCETT path metric, which explicitly accounts for the interference among links that use the same channel. A control parameter β can be used to adjust the tradeoff between channel diversity and path length. The calculation of WCETT can be tuned either to maximize throughput of the given flow or to minimize its impact on other flows.

Certain embodiments of the invention are designed for use in a wireless network with nodes having 802.11-conformant radios. However, other embodiments are applicable to networks based on other wireless technologies. The invention may be used along with one or more other techniques or mechanisms for improving network capacity in multi-hop wireless networks, such as striping techniques or the use of directional antennas. Moreover, while embodiments directed towards wireless environments are described herein, the invention provides a more general and broadly applicable technique for measuring the quality of a wireless or wired network path between nodes, in which a measurement of the overall cost of a route and a measurement of a bottleneck component of the route are combined to produce a path metric.

To calculate the WCETT path metric, it is first necessary to compute ETT for a given link. In one embodiment, ETT is derived by multiplying the number of expected transmissions (e.g., ETX) of the link by a measure of the link bandwidth, yielding a measure of the time spent in transmitting the packet. Using the example of ETX, the ETT becomes:

$$ETT = ETX * \frac{S}{B}$$

where S is a fixed packet size (e.g., 1024 bytes) and B represents the bandwidth (raw data rate) of the link. Other embodiments may calculate ETT using derivations of the number of expected transmissions other than the ETX derivation. The Expected Transmission Time (ETT) is not limited to measurements using ETX and may use other calculations derived from the probability of success for a transmission.

Calculating ETT requires knowledge of the forward and reverse loss rates ($p_f$ and $p_r$, respectively) and the bandwidth of each link. One method for determining the values of $p_f$ and $p_r$ is to use a broadcast packet technique such as the technique disclosed in the De Couto et al. reference cited above. In this method, each node periodically (e.g., once per second) sends out a broadcast packet. Note that broadcast packets are not retransmitted by the 802.11 MAC. Nodes track the number of probes received from each neighbor during a sliding time window (e.g., ten seconds) and include this information in their own probes. A node can calculate $p_r$ directly from the number of probes it receives from a neighbor in the time window, and it can use the information about itself received in the last probe from a neighbor to calculate $p_f$. Other methods for determining the values of $p_f$ and $p_r$ may also be used without departing from the spirit or scope of the invention. For example, a query could be made to the retransmission counters on the network interface card (NIC) to discover the forward and reverse loss rates.

FIG. 1 illustrates steps taken by a probe sender in calculating the loss rate for the ETT measurement. The node waits for a period of time (Loss Probe Period) (step 101). It computes the number of probes received from each neighbor since the previously-sent probe (step 103), and it creates a probe that includes this information (step 105). It also calculates the loss rate for the link to each neighbor (step 107). The node broadcasts the probe (step 109) and returns to step 101 to wait.

Figure 2:
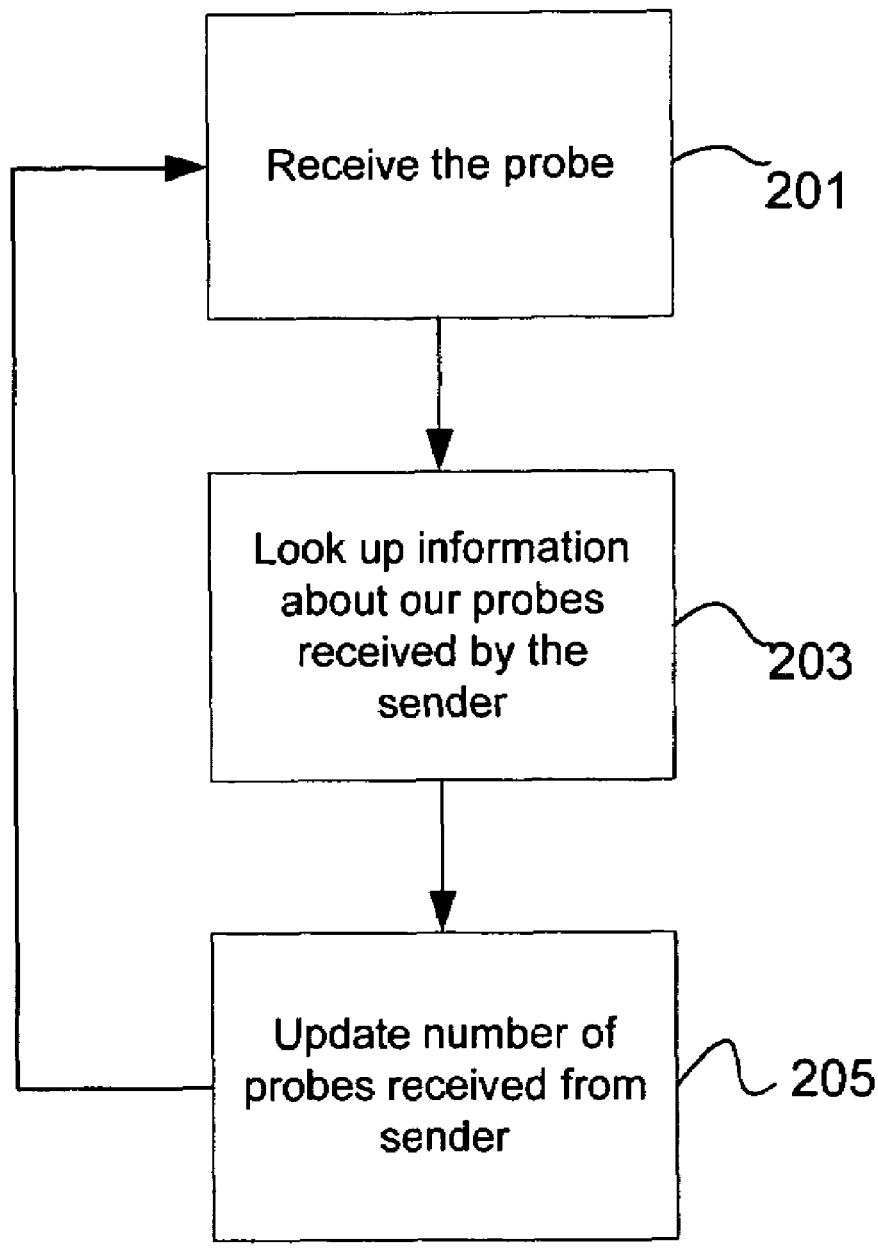
FIG. 2 is a flow diagram illustrating steps taken by a probe receiver with respect to the loss rate calculation, in accordance with an embodiment of the invention.

FIG. 2 illustrates steps taken by the receiver with respect to the loss rate calculation. The node receives the probe (step 201). It looks up information concerning those of its probes that have been received by the sender (step 203). It updates the number of probes received from the sender (step 205), and returns to step 201.

Calculating bandwidth is a more complex problem. One possibility is to restrict the bandwidth of each 802.11 radio to a given fixed value. Another possibility is to allow the radios to select the bandwidth for every packet automatically. This feature, known as autorate, is supported by most modern 802.11 cards. However, in the case of 802.11 cards where the autorate algorithm is not publicized and the bandwidth information is not supplied by drivers, an accurate measure of bandwidth may only be obtained empirically.

In one embodiment, the known technique of packet pairs is used to obtain an empirical measurement of bandwidth. The packet pairs technique is described in, for example, S. Keshav, "A Control-Theoretic Approach to Flow Control," ACM SIGCOMM (September 1991), incorporated herein by reference. Each node periodically (e.g., every minute) sends two back-to-back probe packets to each of its neighbors. The first probe packet is small (e.g., 137 bytes), while the second probe packet is large (e.g., 1137 bytes). Each neighbor measures the time difference between the receipt of the first packet and the second packet and communicates the value back to the sender. The sender takes the minimum of a set of consecutive samples (e.g., the minimum of ten consecutive samples) and then estimates the bandwidth by dividing the size of the second probe packet by the minimum sample. This estimate ignores several factors that affect packet delivery time, but it is sufficiently accurate to distinguish between links of substantially-different bandwidths.

Figure 3:
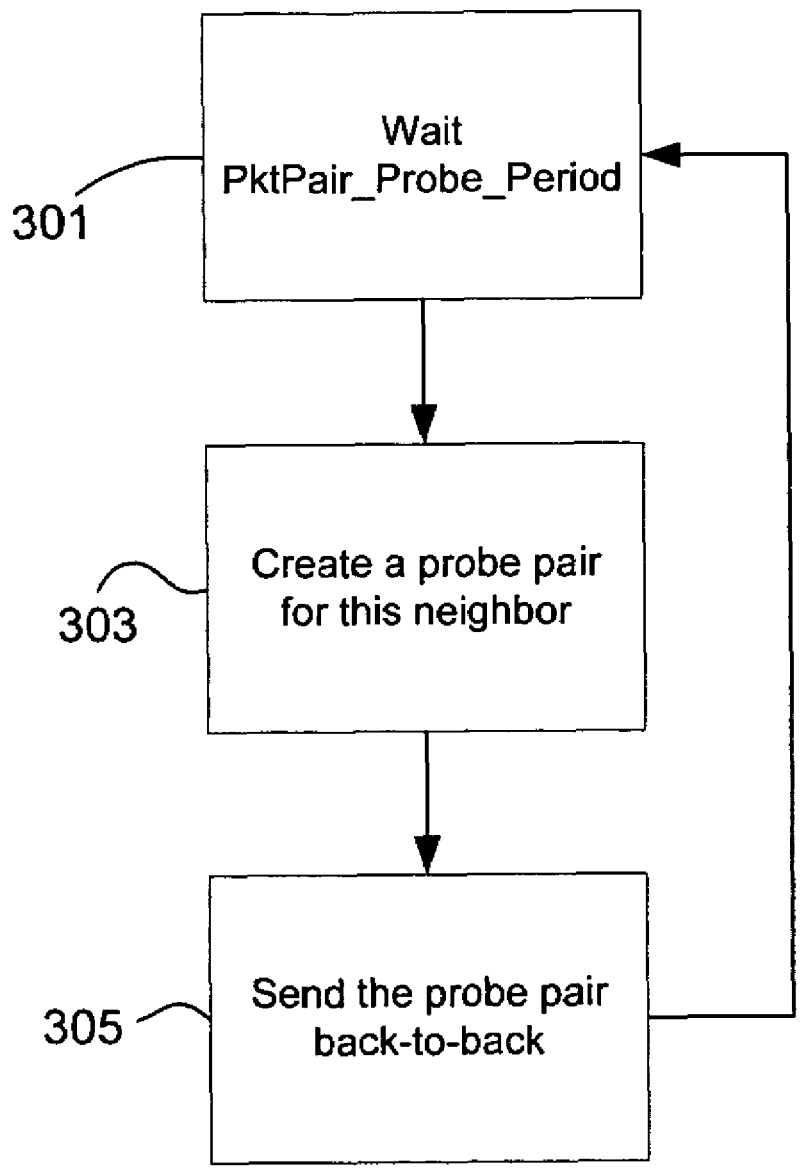
FIG. 3 is a flow diagram illustrating initial steps taken by a probe sender in calculating the bandwidth for each link, in accordance with an embodiment of the invention.

FIG. 3 illustrates initial steps taken by a probe sender in calculating the bandwidth for each link. The node waits for a period (PktPair Probe Period) (step 301). It creates a probe pair for the neighbor (step 303). The node then sends the probe pair back-to-back (step 305), and it returns to step 301.

Figure 4:
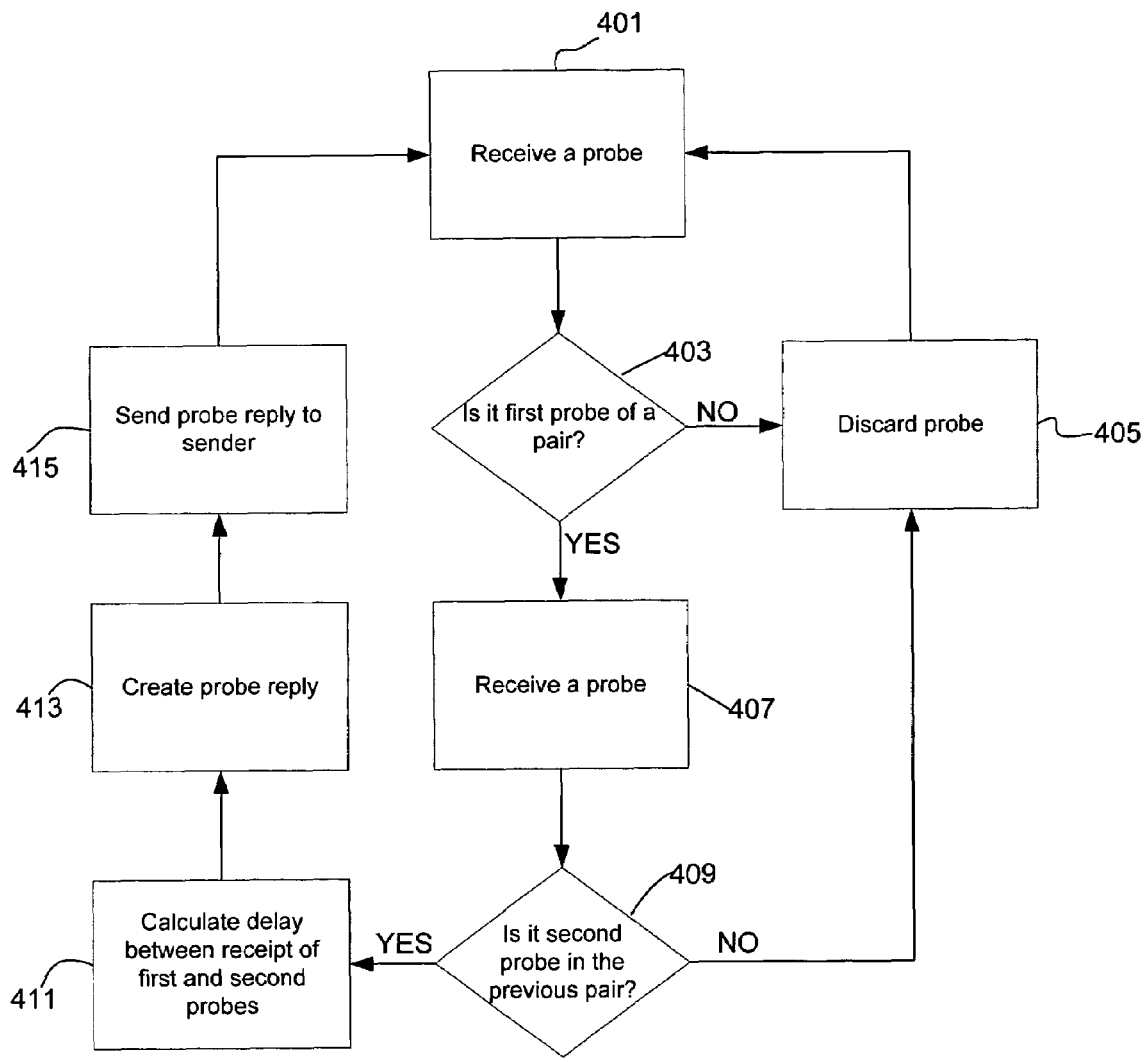
FIG. 4 is a flow diagram illustrating steps taken by a probe receiver with respect to the bandwidth calculation, in accordance with an embodiment of the invention.

FIG. 4 illustrates steps taken by the probe receiver in the bandwidth calculation. The node receives a probe (step 401). If the probe is not the first probe of a pair (step 403), the node discards the probe (step 405) and returns to step 401. Otherwise, the node receives a second probe (step 407). If this probe is not the second probe of the pair (step 409), the node discards the probe (step 405) and returns to step 401. Otherwise, the node calculates the delay between the receipt of the first and second probes (step 411). The node then creates a probe reply (step 413), and sends the probe reply to the sender (step 415). The node then returns to step 401.

Figure 5:
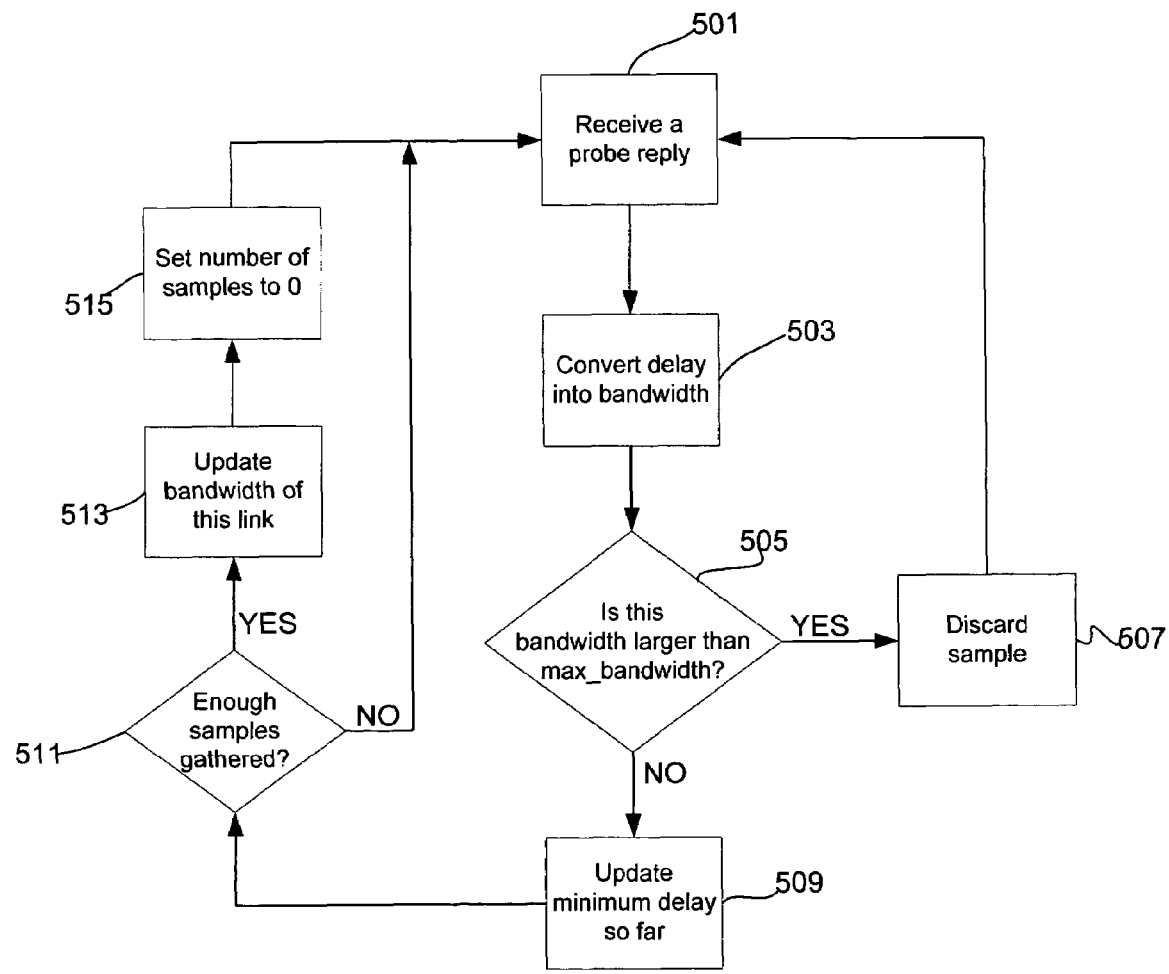
FIG. 5 is a flow diagram illustrating steps taken by a probe reply receiver with respect to the bandwidth calculation, in accordance with an embodiment of the invention.

FIG. 5 illustrates steps taken by the probe reply receiver in the bandwidth calculation. The node receives a probe reply (step 501). It converts the delay value into a bandwidth sample (step 503). If this bandwidth value is larger than a maximum bandwidth (step 505), the node discards this sample (step 507). Otherwise, it updates the minimum delay value so far (step 509). If the full set of samples has been not yet been gathered (step 511), the node returns to step 501. Otherwise, the node updates the bandwidth measurement for this link (step 513) and sets the number of samples to 0 (step 515), and then returns to step 501.

Once the ETT for each link i from node x to node y, $ETT_i$, has been calculated, it is necessary to combine the individual ETT link weights of hops along a path into a metric, WCETT, that reflects the overall desirability of the path. There are three underlying design goals for the WCETT path metric. First, the path metric should take both link bandwidth and physical layer loss rate into account when selecting a link for inclusion in the routing path. In 802.11 networks, for example, because the 802.11 MAC incorporates an ARQ mechanism, the transmission time of a packet on a wireless link depends on both of these factors.

Second, the metric that combines the weights of individual links should be increasing. That is, if a hop is added to an existing path, the cost of the path must never decrease, and it preferably should increase. One justification for this requirement is that the traversal of an additional hop involves the consumption of additional resources. Another justification is that the addition of a hop increases total delay along the path. For a TCP connection, this would result in increased round-trip time and hence reduced throughput.

Third, the path metric should explicitly account for the reduction in throughput due to interference among links that operate on the same channel. Similarly, it should also account for the fact that links along a path that do not operate on the same channel do not interfere with one another. Hence, a path that is made up of hops on different channels is preferable to a path in which all the hops are on the same channel.

In keeping with these design goals, WCETT should increase in value as additional links are added to an existing path. This property can be ensured by setting WCETT to be the sum of the ETTs of all hops on the path. However, this incorrectly assumes that all links interfere. Another goal for WCETT is that it reflect the impact of channel diversity. Simply adding up ETTs will not guarantee this property, since no effort is made to distinguish among hops that are on different channels. The WCETT metric therefore requires an additional term.

Initially let us assume that if two hops on a path are on the same channel then they always interfere with one another. This assumption is typically accurate with respect to short paths, but it is somewhat pessimistic for longer paths. When two hops on a path interfere with each other, only one of the hops can be operative at a time. This can be captured by adding together the packet transmission times on the interfering hops. To generalize, consider an n-hop path, and assume that the system has a total of k channels. Define $X_j$ as follows:

$$X_j = \sum_{\text{Hop } i \text{ is on channel } j} ETT_i \quad 1 \le j \le k$$

$X_j$ is the sum of transmission times of hops on channel j. The total path throughput will be dominated by the bottleneck channel, the channel which has the largest $X_j$ value. Based on this, one might suggest the use of this maximum $X_j$ as the definition of WCETT. So defined, the metric will favor paths that are more channel-diverse. However, it can be seen that the value of this metric will not always increase as more hops are added to the path, because additional hops using non-bottleneck channels do not affect the value of the metric.

The desirable properties of the two path metrics previously referred to (the sum of ETTs and the maximum $X_j$) can be combined into one satisfactory metric by taking their weighted average:

$$WCETT = (1 - \beta) * \sum_{i=1}^{n} ETT_i + \beta * \max_{1 \le j \le k} X_j$$

Thus, the WCETT metric is a weighted average of two quantities: the sum of ETTs of all hops along a path, and the sum of ETTs on the bottleneck channel. The second quantity forces selection of channel-diverse paths. β is a tunable parameter subject to $0 \le \beta \le 1$. Selecting β to be 0.5 gives equal weight to channel diversity and the sum of ETTs. If β is selected to be 0, WCETT selects links based solely on their loss rate and bandwidth, without regard to channel diversity. In one embodiment, the selection of β may be automated based on current network bandwidth.

The weighted average WCETT expression can be interpreted in two ways. First, it can be regarded as a tradeoff between global good and selfishness. The first term is the sum of transmission times along all hops in the network. This reflects the total network resource consumption along this path. The second term reflects the set of hops that will have the greatest impact on the throughput of the path. The weighted average can then be viewed as an effort to balance the two. The equation can also be seen as a tradeoff between throughput and delay. The first term can be viewed as a measure of the latency of the path. Since the second term represents the impact of bottleneck hops, it can be viewed as a measure of path throughput. Here too, the weighted average can be regarded as an attempt to balance the two.

Figure 6:
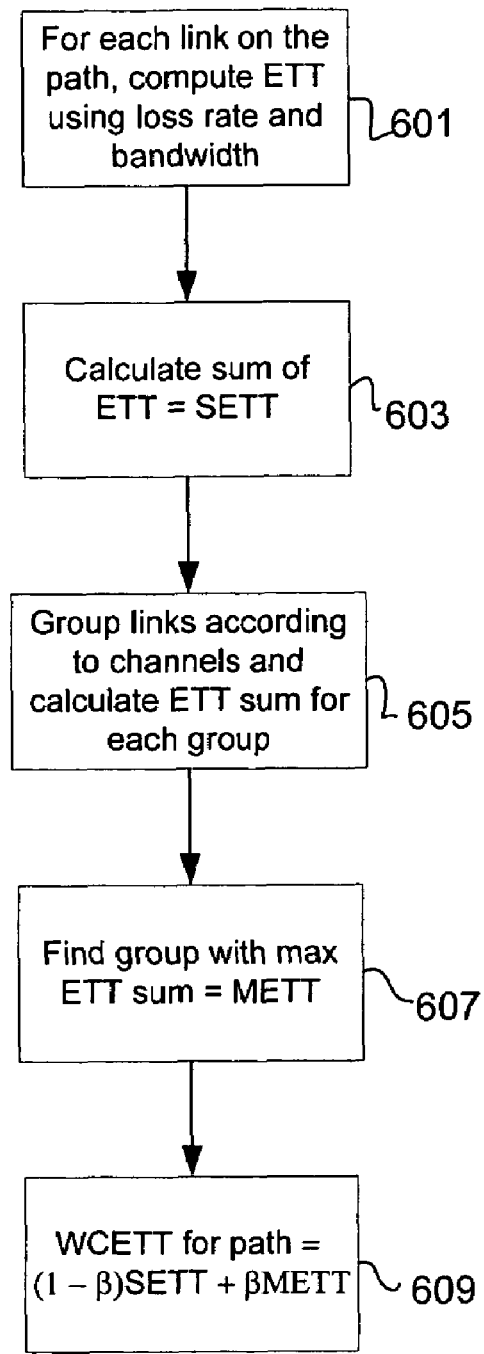
FIG. 6 is a flow diagram illustrating steps involved in the computation of WCETT for a given path, in accordance with an embodiment of the invention.

FIG. 6 illustrates steps involved in the computation of WCETT for a given path. For each link on the path, the node computes ETT using loss rate and bandwidth (step 601). The node calculates the sum of ETTs (step 603). It then groups links according to channels and calculates the ETT sum for each group (step 605). The node finds the group having the maximum ETT sum (step 607). Finally, the node calculates WCETT for the path as (1−β) multiplied by the sum of ETTs plus β multiplied by the maximum ETT sum by channel group (step 609).

Figure 7:
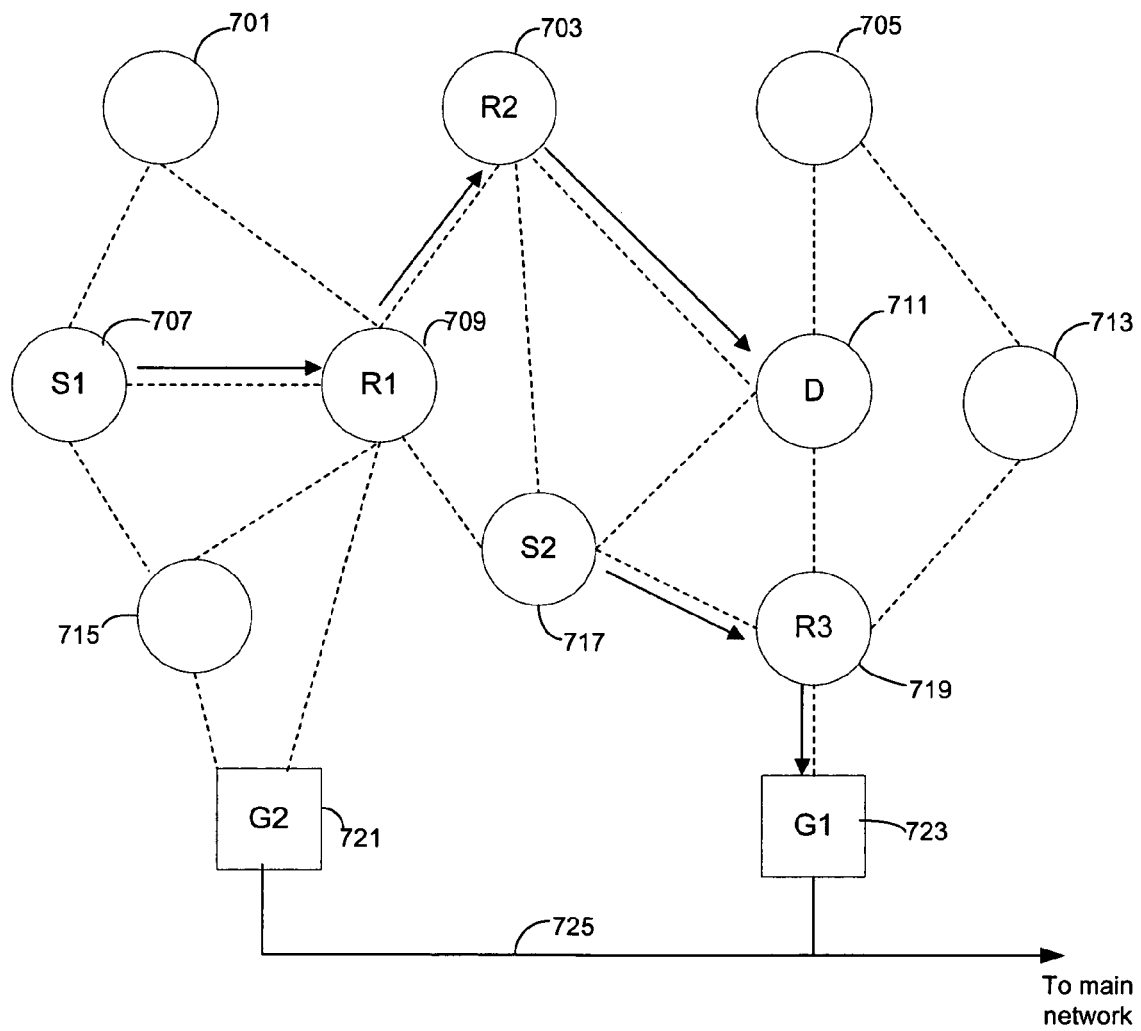
FIG. 7 is a diagram illustrating an exemplary network environment within which an embodiment of the present invention may be incorporated.

The diagram of FIG. 7 shows an exemplary network environment within which certain embodiments of the present invention may be incorporated. The illustrated network is, in part, a multi-hop wireless network. As depicted, the network includes wireless nodes 701, 703, 705, 707, 709, 711, 713, 715, 717, 719. As is typical, the depicted wireless network does not operate in isolation from other networks; as shown, the network is connected to a second, often larger network, such as the Internet, through gateway devices 723, 721, which are connected by wired communication means 725 to the second network. The dashed lines represent existing wireless radio links. A node such as node 701 is a computing device that may have any number of general-purpose or special purpose configurations and architectures, as is rudimentary to those of skill in the art. In general, such devices will have at least a processor and a memory hierarchy, and wired and wireless network interface hardware. In particular, a node in such a network may have one or more digital packet radio transceivers for wireless communication across a frequency channel, such as, without limitation, those included in network interface cards conformant to 802.11a, 802.11b and 802.11g IEEE standards.

Because a radio has a limited wireless communication range, many pairs of nodes in such a network cannot communicate directly, and must instead rely on one or more cooperating nodes in the network to act as intermediate nodes, forwarding data from the source node to the destination node. A source node thus typically transmits a data packet to a neighboring node with which it can communicate directly. The neighboring node in turn transmits the packet to one of its neighbors, and so on, until the packet is transmitted to its ultimate destination. Each link that a packet is transmitted over is a called a "hop." The set of links that a packet travels over from the source node to the ultimate destination node is the route or path for that packet. The route is discovered by way of a routing protocol that is run in a distributed manner on the several nodes of the multi-hop network. In FIG. 7, two exemplary routes are depicted. Node S1 707 transmits a packet to intermediate node R1 709, which transmits the packet to intermediate node R2 703, which transmits the packet to the destination node D 711. The solid black arrow lines between these nodes represent the data traffic links comprising this route. Node S2 717 sends a packet destined for the external network to intermediate node R3 719, which transmits the packet to the gateway 723.

In an embodiment of the invention, the WCETT metric is implemented in association with MR-LQSR (Multi-Radio Link Quality Source Routing), a modified version of the Link Quality Source Routing (LQSR) protocol operating within a Mesh Connectivity Layer (MCL) routing framework. Certain features of LQSR were disclosed in the commonly-owned U.S. patent application Ser. No. 10/784,687, "System and Method for Link Quality Source Routing," filed on Feb. 23, 2004, having common inventorship with the present application and incorporated herein by reference, and certain features of MCL were disclosed in the commonly-owned U.S. patent application Ser. No. 10/610,397, "Method and System for Providing a Virtual Protocol Interlayer," filed on Jun. 30, 2003, having an inventor in common with the present application and incorporated herein by reference. Some of these features are also discussed in R. P. Draves, J. Padhye, and B. D. Zill, "Comparison of Routing Metrics for Static Multi-Hop Wireless Networks," Technical Report MSR-TR-2004-18, Microsoft Research (March 2004), incorporated herein by reference.

MCL implements a virtual network adapter situated within an interposition layer between layer 2 (link layer) and layer 3 (network layer). To higher-layer applications, MCL appears to be another Ethernet link, having its own 48-bit virtual Ethernet address, distinct from the layer 2 addresses of the underlying physical adapters. To lower layers MCL appears to be another protocol running over the physical link. Multiple physical network adapters can be multiplexed into a single virtual link, over which network protocols can run unmodified.

The MCL adapter routes packets using MR-LQSR. For a given node, the MRLQSR protocol discovers the neighbors of the node, assigns weights to the links that a node has with its neighbors, propagates this information to other nodes in the network, and uses the link weights to find a good path to a given destination, by combining the link weights to form path metrics. The reader is referred to the incorporated patent applications and technical report cited above for additional details regarding MCL and LQSR. The invention is not restricted to implementations based on MCL and LQSR, however. In other embodiments of the invention other routing protocols and frameworks may be used.

To implement WCETT, it is necessary to convey a channel number as well as the loss rate and bandwidth or the ETT of each link. In one embodiment 8 bits of the metric value are used to encode an abstract channel number. Other ways of conveying the channel number are possible.

The use of the terms "a," "an" and "the" and similar referents in the context of describing the invention is to be construed to cover both the singular and the plural, unless otherwise indicated herein or clearly contradicted by context. The terms "comprising," "having," "including," and "containing" are to be construed as open-ended terms (meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples or exemplary language herein ("such as", "for example," "e.g.," etc.) is intended merely to better illuminate the invention and does not indicate a limitation on the scope of the invention unless otherwise claimed. No language in the specification should be construed as indicating any non-claimed element as essential to the practice of the invention.

Figure 8:
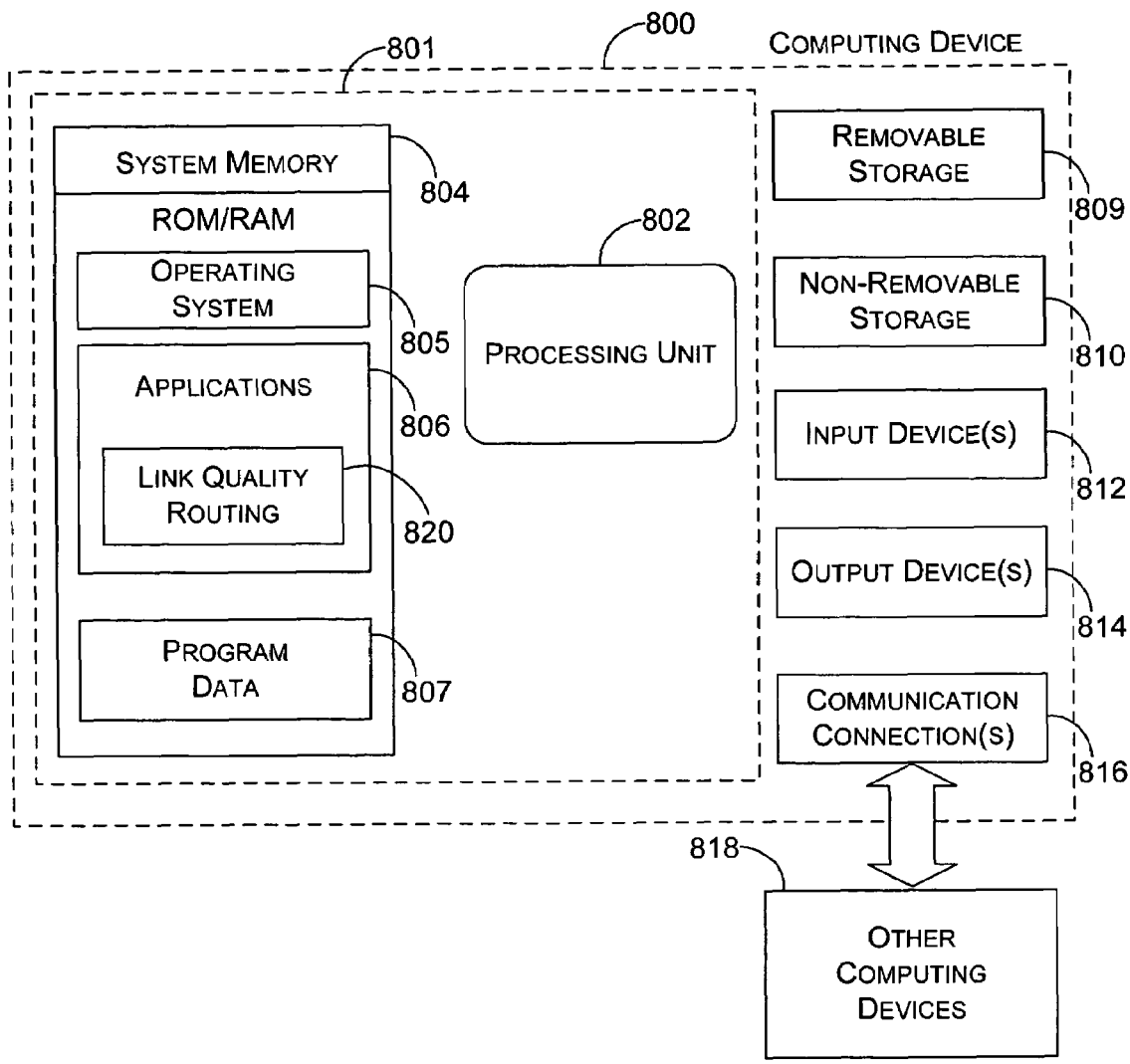
FIG. 8 is a diagram illustrating an exemplary computing device that may be used in one exemplary embodiment of the present invention.

Referring to FIG. 8, an exemplary system for implementing the invention includes a computing device, such as computing device 800. In a basic configuration, computing device 800 typically includes at least one processing unit 802 and system memory 804. Depending on the exact configuration and type of computing device, system memory 804 may be volatile (such as RAM), non-volatile (such as ROM, flash memory, and the like) or some combination of the two. System memory 804 typically includes an operating system 805, one or more applications 806, and may include program data 807. This basic configuration is illustrated in FIG. 8 by those components within dashed line 808.

Computing device 800 may also have additional features or functionality. For example, computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and non-volatile, removable and non-removable media implemented in any method or technology for storage of information, such as computer readable instructions, data structures, program modules or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. All these devices are known in the art and need not be discussed at length here.

Computing device 800 also contains communications connection(s) 816 that allow the device to communicate with other computing devices 818, such as over a network or a wireless mesh network. Communications connection(s) 816 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 806 further include an application 820 for implementing mesh networking functionality in accordance with the present invention. The functionality represented by application 820 may be further supported by additional input devices, 812, output devices 814, and communication connection(s) 816 that are included in computing device 800 for establishing and maintaining an ad-hoc network.

Preferred embodiments of this invention are described herein, including the best mode known to the inventors for carrying out the invention. Variations on those preferred embodiments will become apparent to those having ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A system for routing in an ad hoc network; wherein the ad hoc network includes nodes, the system comprising:
    a mechanism that is configured to:
        broadcast a probe;
        determine a loss rate by counting a number of probes received from neighbors of a node during a predetermined period of time;
        calculate a loss rate for each link that is associated with the node and each of its neighbors;
    a mechanism for assigning a weight to each link in a route from one node to a another node; and
    a mechanism for combining the individual link weights for the route into a path metric, wherein the path metric includes adding expected transmission times of links that interfere with one another and considering separately the expected transmission times for non-interfering links; wherein the path metric accounts negatively for radio interference among links that use a shared channel by reducing throughput among the links in the route that use the shared channel; and wherein the path metric accounts positively for links that use a different channel by increasing throughput among the links in the route.

2. The system of claim 1, wherein the ad hoc network includes one or more nodes having multiple radio transceivers.

3. The system of claim 1, wherein the ad hoc network includes one or more nodes having multiple heterogeneous radio transceivers.

4. The system of claim 1, wherein assigning a weight to each of the links further comprises determining the weight from a measurement of an expected number of times a packet is transmitted on the link to get the packet successfully across the link, multiplied by a bandwidth measurement for the link.

5. The system of claim 4, wherein the measurement of the expected number of times a packet is transmitted on the link to get the packet successfully across the link comprises an ETX (expected transmission count metric) measurement.

6. The system of claim 4, wherein the bandwidth measurement is determined empirically.

7. The system of claim 4, wherein the bandwidth measurement is determined using a packet pairs technique.

8. The system of claim 1, wherein the path metric comprises a weighted average, $$(1-\beta) * \sum_{i=1}^{n} W_i + \beta * \max_{1 \le j \le k} X_j$$

wherein $n$ is the number of links in the route, $W_i$ is the weight for link $i$, $X_j$ is the sum of weights on channel $j$, $k$ is the number of channels, and $\beta$ is a parameter subject to $0 \le \beta \le 1$.

9. The system of claim 8, wherein the sum of weights on channel j (i.e., $X_j$) is calculated by, $$X_j = \sum_{\text{Hop } i \text{ is on channel } j} W_i \quad 1 \le j \le k$$

such that a total path throughput is dominated by a bottleneck channel, wherein the bottleneck channel is the channel which has the largest $X_j$ value.

10. The system of claim 8, wherein the weight for link i comprises a measurement of an expected number of times a packet is transmitted on link i to get the packet successfully across link i, multiplied by a bandwidth measurement for link i.

11. In a multi-hop network, a method for measuring link quality of a route from a source node to a destination node, the route comprising a plurality of links, the method comprising:

for each link in the route, assigning a weight in accordance with a performance of the link; and combining the assigned link weights for the route into a path metric, wherein the path metric includes adding expected transmission times of links that interfere with one another and considering separately the expected transmission times for non-interfering links; wherein the path metric accounts negatively for radio interference among links that use a shared channel by reducing throughput among the links in the route that use the shared channel; and wherein the path metric accounts positively for links that use a different channel by increasing throughput among the links in the route.

12. The method of claim 11, wherein the multi-hop network includes one or more nodes having multiple radio transceivers.

13. The method of claim 11, wherein the multi-hop network includes one or more nodes having multiple heterogeneous radio transceivers.

14. The method of claim 11, wherein the performance of the link comprises a measurement of an expected number of times a packet is transmitted on the link to get the packet successfully across the link, multiplied by a bandwidth measurement for the link.

15. The method of claim 14, wherein the bandwidth measurement is determined empirically.

16. The method of claim 14, wherein the bandwidth measurement is determined using a packet pairs technique.

17. The method of claim 14, wherein combining the assigned link weights for the route into the path metric comprises:

calculating a sum of the expected transmission times for the links in the route;

for each channel used by one or more of the links, determining a subset of the links that share the channel;

calculating a sum of the expected transmission times for the links in each subset;

determining a subset having a maximum sum; and calculating the path metric as (1-β) multiplied by the sum of the expected transmission times for the links in the route plus β multiplied by the sum of the expected transmission times for the subset having the maximum sum, wherein β is a parameter subject to 0≦β≦1.

18. A computer-readable medium having stored thereon computer-executable instructions for measuring link quality of a route from a source node to a destination node, the route comprising a plurality of links, the computer-executable instructions comprising:

for each link in the route, assigning a weight in accordance with an expected transmission time of a packet over the link; and combining the assigned link weights for the route into a path metric, wherein the path metric includes adding expected transmission times of links that interfere with one another and considering separately the expected transmission times for non-interfering links; wherein the path metric accounts negatively for radio interference among links that use a shared channel by reducing throughput among the links in the route that use the shared channel; and wherein the path metric accounts positively for links that use a different channel by increasing throughput among the links in the route.

19. The computer-readable medium of claim 18, wherein the expected transmission times comprises a measurement of an expected number of times a packet is transmitted on the link to get the packet successfully across the link, multiplied by a bandwidth measurement for the link.

20. The computer-readable medium of claim 18, wherein combining the assigned link weights for the route into the path metric comprises:

calculating a sum of the expected transmission times for the links in the route;

for each channel used by one or more of the links, determining a subset of the links that share the channel;

calculating a sum of the expected transmission times for the links in each subset;
determining a subset having a maximum sum; and
calculating the path metric as $(1-\beta)$ multiplied by the sum of the expected transmission times for the links in the route plus $\beta$ multiplied by the sum of the expected transmission times for the subset having the maximum sum, wherein $\beta$ is a parameter subject to $0 \leq \beta \leq 1$.

* * * * *